July 11, 1950  S. F. VARIAN ET AL  2,514,428
ELECTRONIC APPARATUS OF THE CAVITY RESONATOR TYPE
Filed Jan. 6, 1943  3 Sheets-Sheet 1
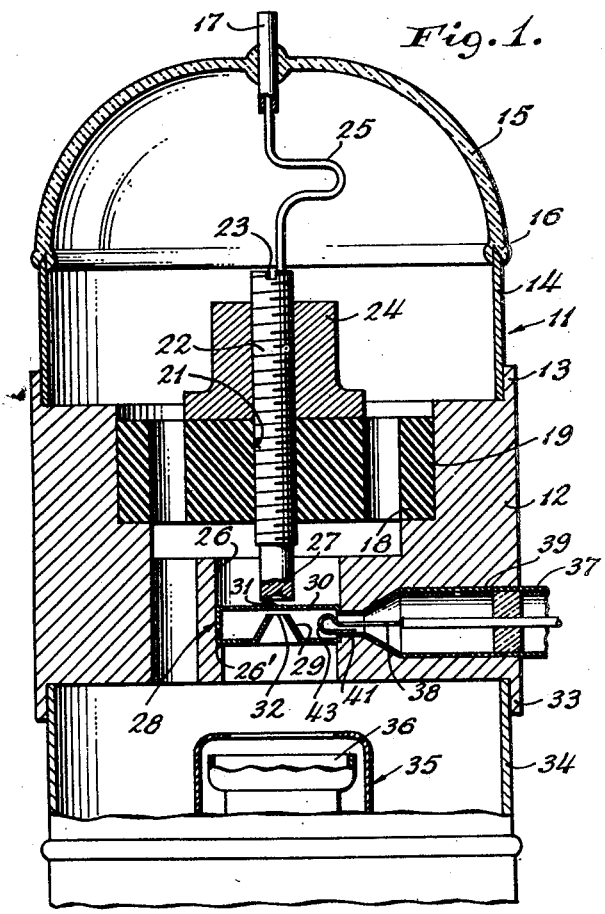
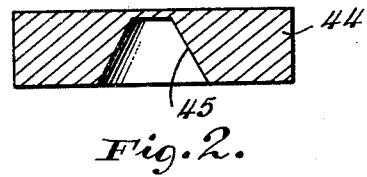
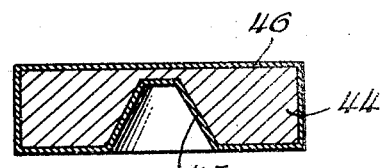
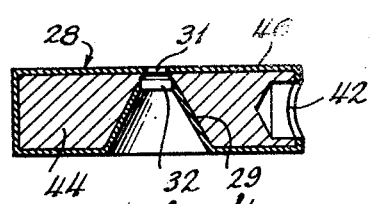
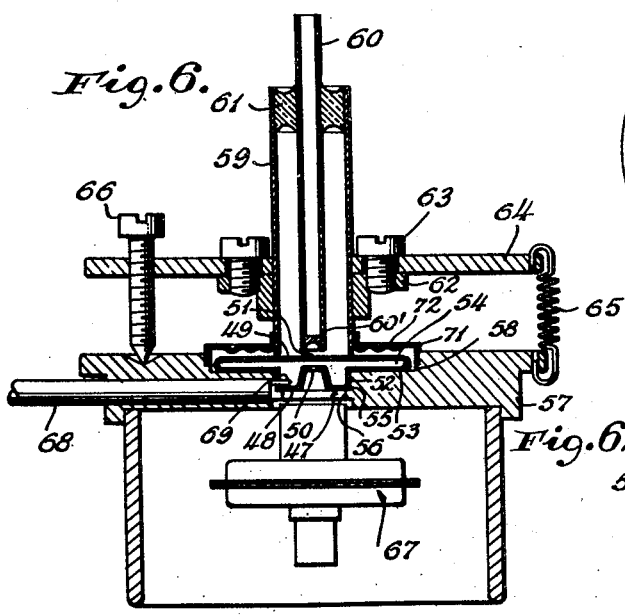
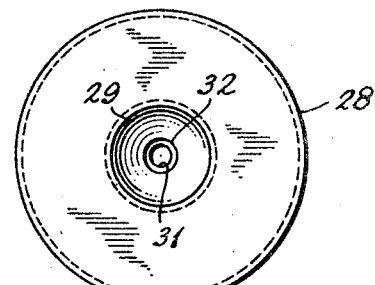
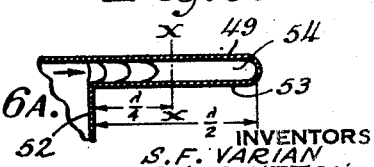
INVENTORS
S. F. VARIAN
E. L. GINZTON
BY Paul B. Hunter
ATTORNEY

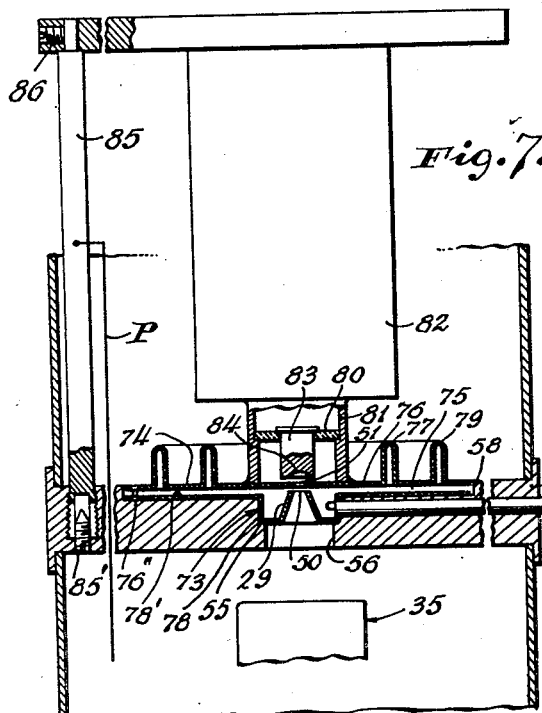
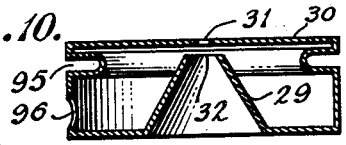
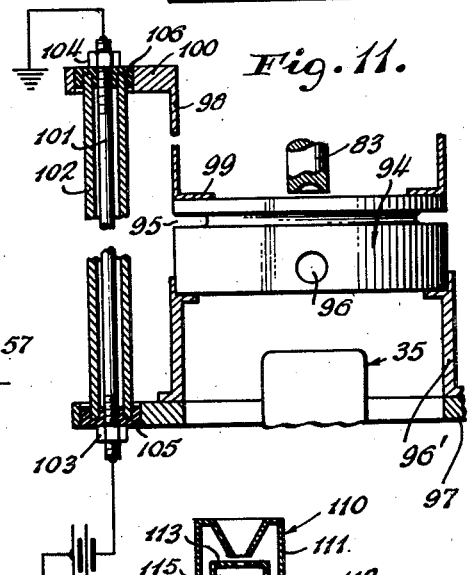
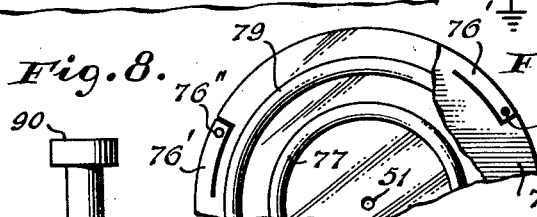
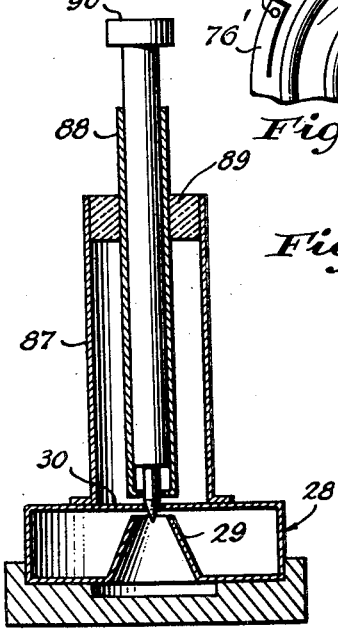
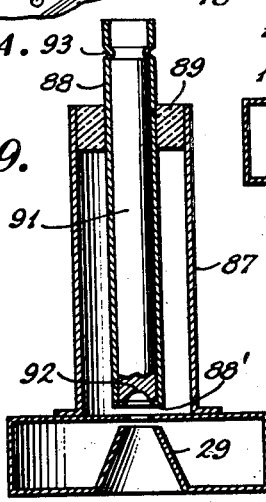
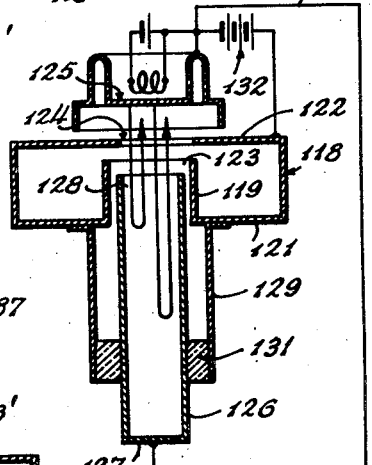

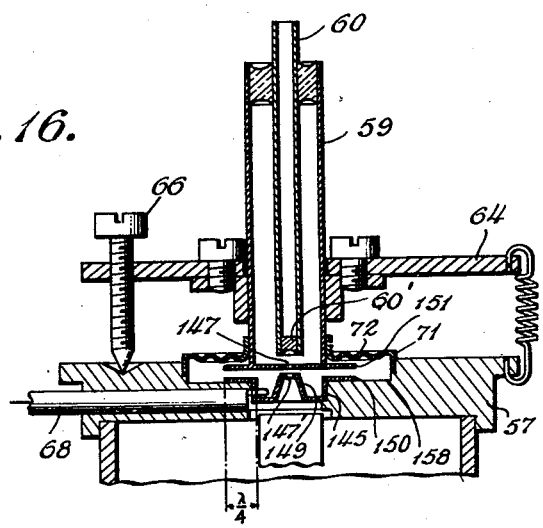
Fig. 15.
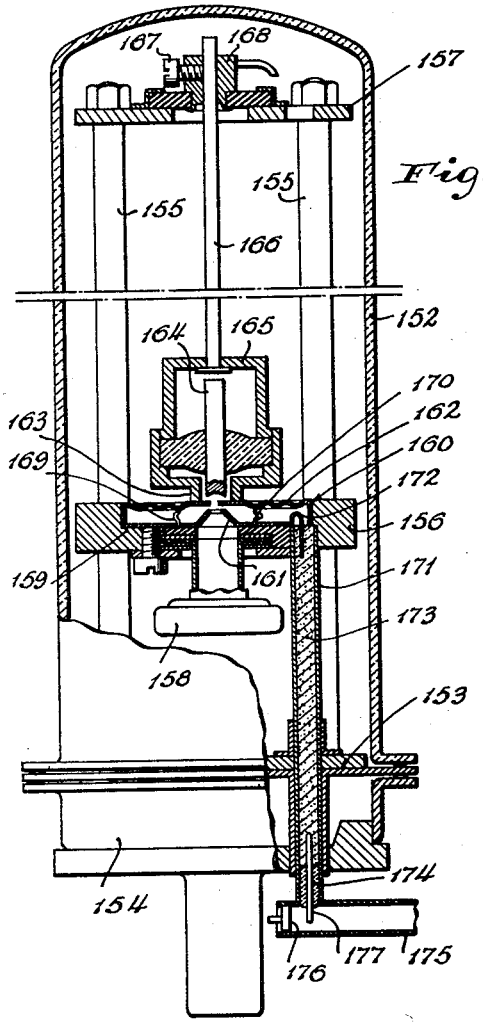
Fig. 16.
Fig. 14.
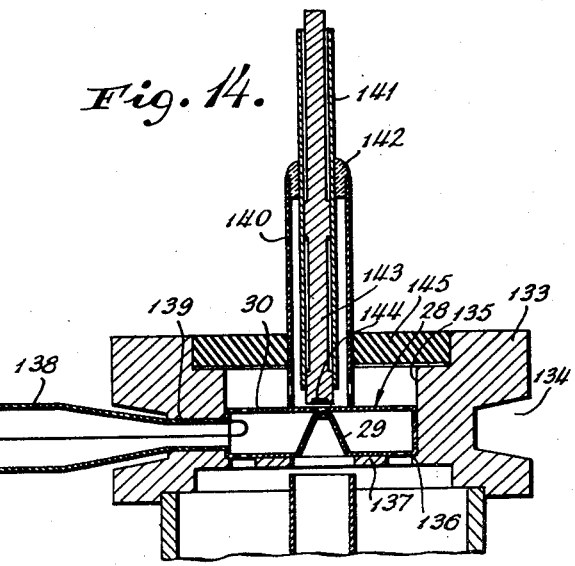
Fig. 17.
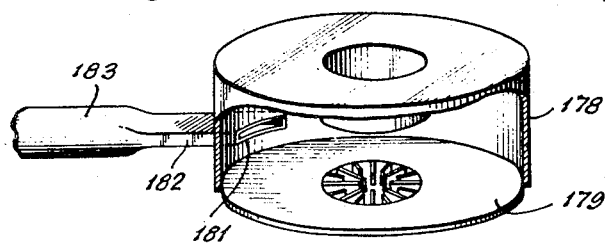
INVENTORS
S. F. VARIAN
E. L. GINZTON
BY
Paul B. Hunter
ATTORNEY Patented July 11, 1950

2,514,428

UNITED STATES PATENT OFFICE 2,514,428

ELECTRONIC APPARATUS OF THE CAVITY RESONATOR TYPE

Sigurd F. Varian, Garden City, and Edward L. Ginzton, Wantagh, N. Y., assignors to The Sperry Corporation, a corporation of Delaware Application January 6, 1943, Serial No. 471,508

19 Claims. (Cl. 315—5)

Our invention relates to electronic apparatus and products and methods of making the same and is particularly concerned with methods of manufacturing ultra high frequency cavity resonators and assemblies and the resultant products.

Ultra high frequency devices of the velocity modulation type employing cavity resonators are being widely used for frequencies in the neighborhood of $10^8$ cycles per second or more. These resonators have dimensions corresponding to the resonant wavelength of the electromagnetic field oscillating therewithin. The present tendency is toward devices resonating at shorter wavelengths thus requiring the production of hollow resonators of very small physical dimensions. This has raised many difficult problems of manufacture and assembly of both the resonator and the apparatus with which it is used, since the exacting requirements for accurately measured construction essential in all such resonators must be met in these very small resonators wherein even slight changes in shape and size produce widely varying results.

Attempts to produce these small resonators by usual machining methods have proven unsatisfactory because of the delicate nature of the undertaking and the difficulty in properly machining such hollow thin-walled metal members to exact shape and size and for obtaining the smooth continuous interior surfaces essential in these resonators. The small physical dimensions of such short wavelength resonators also raises problems of tuning and mounting, as well as problems of coupling to a source of energy, which are not satisfied by the arrangements used for the same purpose in larger assemblies.

With the above in mind, it is a major object of our present invention to provide novel ultra high frequency resonator apparatus wherein component elements of relatively small physical dimensions are accurately and easily made and assembled, and methods of making the same.

A further object of the invention is to provide a novel accurately dimensioned and finished hollow resonator structure of very small size, and novel methods of making the same.

A further object of the invention is to provide an accurately dimensioned very small hollow resonator of novel structure for enabling efficient controlled tuning.

It is a further object of the invention to provide high frequency apparatus embodying novel means for tuning resonators, especially those of very small physical dimensions.

A further object of the invention is to provide an ultra high frequency device of the velocity modulation type operating on the reflex principle and embodying novel associated resonator and reflector arrangements.

A further object of the invention is to provide a novel high frequency apparatus employing novel thermal tuning arrangements.

A further object of the invention is to provide a novel high frequency apparatus embodying novel thermal tuning devices inductively shielded from interfering with normal operation of the apparatus.

A further object of the invention is to provide a novel reflector and resonator assembly for high frequency apparatus of small size, and methods of making the same.

A further object of the invention is to provide a novel cavity resonator structure having special arrangements for extracting therefrom energy in a desired mode of oscillation.

A further object of the invention is to provide novel wave guide arrangements for extracting energy from a cavity resonator.

Further objects of the invention will presently appear as the description of the invention proceeds in connection with the appended claims and the annexed drawings wherein:

Fig. 1 is a greatly enlarged section through the axis of an ultra high frequency oscillator embodying our invention;

Figs. 2, 3 and 4 are sections illustrating successive steps in a preferred method of making the very small hollow resonator shell used in the apparatus of Fig. 1;

Fig. 5 is a bottom plan view of the hollow resonator shell resulting from the process of Figs. 2-4;

Fig. 6 is an enlarged section through the axis of an associated resonator and reflector assembly equipped with tuning mechanism, illustrating another embodiment of the invention;

Fig. 6A is a partially diagrammatic elevation in section showing the theory of operation of the resonator type of Fig. 6;

Fig. 7 is an enlarged section of a somewhat modified form of the invention illustrating chiefly tuning and support arrangements for such very small cavity resonators, a center tapped thermal tuning arrangement, and a different resonator structure;

Fig. 7A is a top plan view of the resonator of Fig. 7 illustrating the connection between the two parts of the shell;

Fig. 8 is an axial section illustrating an early step in our method of assembling a reflector and resonator into a properly aligned unit;

Fig. 9 illustrates in section the complete assembly of reflector and resonator following the method of Fig. 8;

Fig. 10 is an enlarged section illustrating a further shape of tunable resonator of the invention;

Fig. 11 illustrates partly in section a manner of tuning the resonator of Fig. 10, as well as an inductively shielded thermal tuning arrangement;

Fig. 12 is an enlarged section through the axis of a further very small resonator and reflector assembly structure designed for efficient tuning;

Fig. 13 is an axial section of a further embodiment of the invention employing a hollow reflector;

Fig. 14 is an enlarged section of another small resonator and reflector assembly according to the invention;

Fig. 15 is a section through the axis of a further embodiment of the invention wherein the wave trap flange is open along its outer periphery;

Fig. 16 is an axial section through an electronic tube embodying a further form of the invention employing a different resonator structure and manner of extracting energy therefrom; and Fig. 17 is a representation partly in perspective and partly in section of a further form of the invention wherein a wave guide extracts energy from the side wall of a small resonator.

The invention will be described as embodied in practical ultra high frequency apparatus of the velocity modulation type wherein the hollow resonator is designed to resonate at one centimeter wavelength and is mounted in a tube of the type known as a reflex device. It will be understood, however, that the invention in principle is applicable to apparatus of any size, but it is particularly advantageous when employed with tubes resonating at one centimeter or lower wavelengths.

Referring to Fig. 1, a tube or envelope 11 comprises a relatively thick cylindrical metal support 12 internally shouldered at one end to form a projecting narrow cylindrical flange 13 for telescopingly fitting with a cylindrical barrel 14 of Kovar or some equivalent metal or alloy having about the same coefficient of thermal expansion as glass. That end of the tube is closed by an arcuate cover 15 of glass or like insulating vitreous material having a grooved rim 16 mating with and sealed in gas-tight relation with the exposed end of barrel 14.

Cover 15 is formed with a central hollow boss in which is rigidly sealed a metal terminal 17 forming a reflector connection. Internally of the shoulder seating barrel 14 on support 12 is a deeper shoulder 18 for rigidly seating an insulating block 19. Block 19 is formed with a threaded central aperture 21, preferably axially aligned with terminal 17, for receiving a threaded post 22. A slot 23 is formed in the end of post 22 for receiving a tool for axially shifting post 22. A lock nut 24 is provided for holding the post against axial movement. A flexible wire 25 interconnects terminal 17 and post 22.

The inner end of post 22 extends within a central bore 26 in support 12 and is formed with a depression 27 of substantially spherical curvature surfaced to serve as a directional reflector for a purpose to be later described. Inwardly of reflector 27, bore 26 is formed with an internal shoulder 26' in which is firmly seated a thin-walled hollow generally cylindrical copper shell 28 comprising the resonator.

Resonator 28 is formed at one end wall with a central frusto-conical reentrant pole 29. The other end wall 30 and pole 29 are formed with axially aligned central apertures 31 and 32, respectively. Shell 28 is preferably soldered or similarly permanently secured in seat 26'.

Support 12 is internally shouldered at its other end at 33 for seating a cylindrical barrel 34 surrounding a cathode assembly 35 including an electron beam collimator 36. The other end of barrel 34 is closed by a glass collar and the usual insulating base containing pronged terminals for supplying energy to the cathode and other elements (not shown) within the tube. Post 22, reflector 27, resonator 28 and cathode element 35 are all in exact axial alignment.

A coaxial transmission line of the type usually employed for conducting high frequency energy comprising a tubular conductor 37 and a concentric wire 38 is introduced through a suitably shaped aperture 39 in support 12. At its inner end conductor 37 is tapered to a reduced section 41 having dimensions proportionate to the circumferential wall of resonator 28 and aperture 39 is similarly shaped to snugly accommodate the conductor 37. Conductor 37 is preferably press fitted and soldered into aperture 39 so as to be fixed therein in metal-to-metal contact with support 12 which in turn is in solid contact with resonator 28, and section 41 fits within a port 42 in the wall of resonator 28. Wire 38 enters port 42 to provide an antenna loop 43 within the resonator and is returned to fixed contact with conductor section 41.

In the tube illustrated in Fig. 1, resonator 28 is about one-half of a centimeter in diameter and about two-tenths centimeter thick. This design was calculated to resonate at a frequency of one centimeter wavelength and has so resonated under practical conditions. Since the inner surface dimensions of the resonator chiefly determine its oscillation characteristics, it is obvious that extreme difficulty would be encountered in tediously machining or similarly tooling such a small element. We have discovered a simple process by which resonators of this size and smaller can be accurately made in a very short time.

First, a solid blank or core of zinc is machined until its outside shape, smooth surface and dimensions are the same as calculated for the interior surfaces of a resonator having a desired resonant frequency. Alternately the blank may be formed by a suitable die casting operation, or otherwise die-formed. The finished blank of zinc is shown at 44 in Fig. 2, it being a cylindrical disc having a frustro-conical end depression 45 corresponding to the calculated dimensions of pole 29. The machined blank is then preferably copper-plated by a suitable electrodeposition or distillation process until covered with a copper film 46 of a thickness corresponding to that desired for the walls of the resonator, as shown in Fig. 3. Preferably this film is of about .005" thickness. If desired, electrodeposition on certain of the surfaces of the blank, such as where apertures are to be formed in the shell, may be masked as by a non-conducting coating, but in general it is more convenient to plate the whole blank.

The plated blank is then placed in a suitable jig wherein holes are drilled through the copper plating providing the apertures 31, 32 and 42 and any others desired for resonator 28 as shown in Fig. 4. This step is of appreciable advantage mechanically, as the resonator walls are firmly backed by zinc and are held without deformation during the drilling operations, and it is relatively immaterial to what extent the zinc is pierced by the drills.

The drilled blank is now placed in a bath of hydrochloric acid which enters the drilled holes to violently attack the zinc to quickly dissolve it, leaving the copper shell resonator intact as an integral seamless structure of exactly the desired size and shape, ready for instant use as in Fig. 1.

Zinc is preferred as the blank material because it is easily worked and plated and is selectively reactive with the hydrochloric acid bath. The invention is of sufficient scope, however, to embrace formation of the resonator shell by using blanks of other metal than zinc reactive with any acid not reactive with the shell. Further, the blank can be of any other suitable material, removable from the shell interior by chemical, thermal or other action, without departing from the spirit of the invention. For example, some relatively low melting point material such as a graphited thermoplastic or even Wood's metal may be moulded to shape and then electro-plated, and then melted out after the drilling step. Nor is the invention limited to copper shells, although such are preferable for ultra high frequency work, as any suitable conducting material such, for example, as gold, silver, nickel, etc., capable of being electro-plated and of retaining the given shell-shape, may be employed.

The above method is extremely advantageous in the accurate manufacture of resonators designed to have a single operating resonant frequency, which is increasingly becoming desirable in short wavelength devices, although, as will appear, it can be employed to make selectively tunable resonators. The resonators themselves are extremely light weight, with smooth interior surfaces insuring unobstructed current paths for the oscillating field therewithin, and the shells are wholly undeformed. Resonators of this size have such small apertures 31 and 32 that no grids are needed in those apertures for the velocity modulation and energy extraction operations incident to the usual operation.

Fig. 6 illustrates a reflex tube wherein the resonator, though effectively very small, is of such construction as to be readily deformable for tuning to different resonant frequencies.

Fig. 6 illustrates a very small resonator structure 47 designed for practical tuning. In small resonators, especially those designed to resonate at wavelengths of about one centimeter and less, the available wall space for providing flexibility for tuning the resonator by deformation becomes extremely limited. Also the small wall sections are relatively rigid and difficult to bend. The resonator structure in Fig. 6 avoids this difficulty by providing a highly flexible wall of sufficient area to be easily deformable for tuning but which does not increase the conductive path for the current within the resonator.

Resonator 47 comprises a thin generally cylindrical copper shell having opposed end walls 48 and 49. Wall 48 is formed with a reentrant pole apertured at 50 in axial alignment with an aperture 51 in wall 49. The diameter of wall 49 is substantially twice or three times the diameter of the resonator body defined by side wall 52, and the upper end of wall 52 is turned outwardly providing an annular rim 53 extending close and parallel to wall 49.

Effectively the coextensive parallel portions of wall 49 and rim 53 define parallel condenser plates separated by a space 54 which is relatively small in the direction of the resonator axis. In this structure, the oscillating field is effectively confined with the main resonator body. Looking in the direction of the arrow in Fig. 6A, we see a relatively low impedance to current flow. There will, however, be some slight flow of current between members 49 and 53 as indicated in Fig. 6A, but this becomes progressively very weak with increasing radial distance from wall 52, and substantially no current flow exists between the members at a radial distance from wall 52 of one-quarter-wavelength of the resonant frequency of the main resonator body, or an odd multiple thereof. These odd multiple radial points substantially represent nodal points of the current between the effective condenser plates.

It is apparent therefore that the outer peripheries of wall 49 and rim 53 could very well terminate abruptly at the plane of revolution indicated at X—X in Fig. 6A, thereby providing a resonator device made of two physically separate elements defining an annular wave trap space 54 entirely open along its outer periphery, as will be further described with reference to Figs. 7 and 15.

In the form of the invention shown in Figs. 6 and 6A, we extend wall 49 and rim 53 radially outwardly for a distance of about a quarter-wavelength beyond X—X, the total radial flange width thus becoming approximately one-half-wavelength, and join them integrally along their outer peripheries. Electrically this provides an effective short circuit at the innermost edge of rim 53 for any small currents existing at this distance from the main resonator body, but does not appreciably alter operation of the resonator. Mechanically we have an integral seamless structure made by the method of Figs. 2-5 which can also be employed to make the separate elements of a resonator open along its outer periphery.

The distance across the mouth of space 54 is very small as compared to the resonator wavelength.

The increased size of wall 49 provides a highly flexible wall which is of sufficient area to be deformed with relative ease and certainty of control for changing the parallel distance between apertures 50 and 51 for tuning. Resonator 47 is made by the same process as above described for shell 28; by machining or casting a blank to shape, coating or plating the blank with the shell material, and then extracting the blank from the interior of the shell.

Resonator 47 is seated with the periphery of wall 48 fitted in an annular shoulder 55 formed in an axial bore 56 of metal support disc 57. On its upper face, support 57 is formed with an annular central recess 58 of sufficient depth and diameter to accommodate annular resonator rim 53 which rests on the horizontal face of recess 58. Between shoulder 55 and recess 58, bore 56 is of such diameter as to snugly receive resonator side wall 52. Resonator 47 is held, as by soldering to support 57, rigidly concentric with the axis of the tube.

A hollow cylindrical collar 59 is mounted concentric with resonator 47, the lower end of collar 59 being rigidly fastened as by soldering to wall 49. A slender tubule 60, also concentric with resonator 47, is permanently mounted on collar 59 by an insulating annulus 61 of glass or the like. Preferably collar 59 and tubule 60 are made of the nickle-cobalt-iron alloy known as Kovar, or some other conductive material having about the same coefficient of thermal expansion as glass. An approximately spherical surfaced reflector 60' is mounted in the lower end of tubule 60 centered with aperture 51.

Collar 59 is secured to a flanged coupling 62 which in turn is fastened, as by screws 63, to a plate 64 coextensive with and parallel to support 57. Plate 64 and support 57 are interconnected by tension springs 65 and adjustable screws 66 threaded in plate 64. At least three equally spaced springs and screws are employed, the screws being operable for measurably changing the distance between the plate and support for tuning.

The usual cathode assembly is indicated at 67, located as close to the resonator as possible. A concentric transmission line 68, having an antenna loop 69 extending through a port into the interior of resonator 47, is mounted tightly in a suitable radial bore in support 57.

An annular plate 71, secured, as by soldering, along its inner flanged periphery to collar 59 and along its outer flanged periphery to support 57 in recess 58, has an annularly crimped intermediate portion 72 which is flexible and resilient. Plate 71 extends parallel to resonator wall 49.

As tuning screws 66 are manipulated, plate 64 will be displaced toward or away from support 57. This displaces wall 49, which is rigid with plate 64, to change the parallel distance between apertures 50 and 51 and thereby tune the resonator to different resonant frequencies. During tuning, reflector 60' and aperture 51 maintain their relative spacing and axial alignment. The large available area of wall 49 permits ready and accurately controlled displacement of aperture 51.

Resilient member 71, being parallel to wall 49, reinforces the latter and helps control the tuning movements, and also prevents disruption of the soldered connection between collar 59 and wall 49, by distributing the tuning forces. We have thus provided a controllably tuned resonator having a large flexible wall area 49 for tuning, but enclosing a small effective space determining the limits of the oscillating electromagnetic field. Thus resonator 47 has the same resonant frequency as a resonator of the shape of resonator 28 having the same diameter as wall 52 of resonator 47. In other words, resonator 47 is the substantial equivalent of a smaller resonator structure having wall 52 extended to provide a direct short circuit to wall 49, but has the above-mentioned tuning control features which would not be available in such smaller resonator structure. Space 54 comprises an effective wave trap which prevents the oscillations within resonator 47 from being influenced by the extended annular interior wall surfaces.

Figs. 7 and 7A illustrate mainly an evacuated closure containing a cavity resonator device 73 which is made of two spaced elements defining the main resonator body and a communicating annular extension 74. Space 75 within extension 74 is similar to space 54 in Fig. 6. Wall 76, corresponding to wall 49 of Fig. 6, is formed at right angles with a thin hollow annular projection 77 having a length approximately equal to one-quarter of the resonant wavelength. Projection 77 is located one-quarter of a wavelength from cylindrical wall 78 bounding the main resonator body.

Referring back to the explanation of Fig. 6A, it is apparent that the juncture of extension 74 and projection 77 is located at a point of substantially zero current flow, so that effectively the first quarter wavelength section of extension 74 plus projection 77 is the same as the Fig. 6 construction. Since there is no appreciable current flow at this juncture, no appreciable difficulty is encountered in leaving space 75 open at this point.

A second hollow annular projection 79 of the same dimensions as and spaced one-quarter wavelength from projection 77 may be added as desired, although it may be omitted for most purposes, and extension 74 terminates outwardly of projection 79 with space 75 open outwardly along the entire periphery.

As shown in Fig. 7A the top and bottom resonator elements are preferably secured together along their outer peripheries by a connection which is weak to permit tuning displacement of wall 76 but strong to prevent relative lateral displacement of the elements. Such a connection may comprise slitting wall 76 and the parallel rim 78' below it along their peripheries as shown, to provide integral spaced tabs 76'. Rivets 76" interconnect the free ends of tabs 76', thereby holding the two resonator elements against relative rotation or lateral displacement. Since tabs 76' are in effect very flexible spring beams, they readily permit axial displacement of wall 76 for tuning.

The two separate elements of resonator 73 may be made by the method of Figs. 2-5. Electrically, resonator 73 operates similarly to resonator 47 above described. Mechanically, resonator 73 is more desirable for tuning than resonator 47, because the spring connection at 76' offers less resistance than an integral wall joint.

It will be understood that where we refer herein to cavity resonator devices we intend to include structures wherein the device is an integral shell as in Fig. 1, or is defined by interconnected spaced walls or members as in Fig. 7, or is even defined by entirely separated walls or members as will appear in Fig. 15.

Resonator 73 is tunable to different resonant frequencies in the following manner. A metal collar 81 is fixed, as by threading or soldering, to the inner end of an elongated tubing 82 concentric with the resonator axis. The inner end of collar 81 is soldered or similarly fastened to the flexible end wall 76 of resonator 73. Collar 81 supports a disc 80 of insulating glass or like material on which is rigidly mounted a metal block 83 formed with a reflector 84 similar to reflector 27. Block 83 is connected to a suitable terminal, as in Fig. 1.

Tubing 82 therefore supports reflector 84 properly relative to the resonator and in turn is supported by a balanced set of struts or rods 85 extending parallel thereto (only one shown) and to one end of which it is rigidly attached as by set screws 86. The other ends of rods 85 are rigidly anchored as by set screws 85' in support 57.

Each rod 85 is of metal having known and uniform high thermal expansion properties and is heated by a circuit including a potential lead P extending through an insulated bushing (not shown) in support 57 to be fixed to the central position of rod 85. Support 57 and, consequently, the opposite ends of rod 85 are at ground potential. This gives a higher heating current in the rod since the two halves are in parallel, and also the rod expansion is more uniform and responsive more quickly to temperature changes along the shorter current paths. The higher current promotes more efficient response to tuning control.

As the temperature of rods 85 is varied, so do the rod lengths, thereby effecting axial shift of tubing 82 toward or away from support 57. As tubing 82 advances toward the support, it causes displacement of resonator wall 76 substantially parallel to the axis for changing the parallel distance between apertures 50 and 51. This alters the resonant frequency of resonator 73. The reverse operation takes place when tubing 82 is displaced in the opposite direction.

The invention therefore provides for thermal tuning of the resonator. Thus by controlling the potential on lead P after suitable calibration, the resonant frequency of resonator 73 may be preset. Although thermal tuning broadly is known, our above-described arrangements wherein the thermal strut is center-tapped so that the ends of the strut may be secured by rigid mechanically solid, metal-to-metal connections to the tube elements are very useful. This structure especially avoids the difficulties previously encountered in thermal tuning devices wherein the strut ends were held in mechanically weak insulated bushings which often failed under stress.

The above-described arrangements for thermal tuning need not be enclosed within the evacuated tube envelope, as the strut may be attached to extensions of adjustable tuning elements outside the tubes as in the case of larger structures. In such arrangements the strut is usually maintained well above room temperature for the desired frequency adjustment range so that incremental room temperature changes are without appreciable tuning effect.

Alternatively the reflector structure and tuning arrangements of Fig. 6 may be employed in Fig. 7.

Figs. 8 and 9 illustrate an efficient manner of assembling a resonator and reflector into a permanent sub-assembly to insure permanent accurate axial alignment of these elements, which is essential for proper operation and is extremely difficult to obtain by adjustment during assembly of such small parts. Resonator shell 28, here referred to by way of example, after being fabricated as above explained, is lightly seated in a suitable support with end wall 30 opposite the reentrant pole facing upwardly. A relatively short collar 87 of Kovar or some equivalent metal is provided carrying an accurately concentric small metal tube 88. Tube 88 may have a flat flange on its base for convenience in support as shown but such is not essential, as the method may be used to assemble tube 59 and resonator 47, for example. Collar 87 and tube 88 are sealed together by an annular gas-tight joint 89 of glass or some equivalent material. Collar 87 is shifted about over wall 30 until tube 88 is exactly concentric with apertures 31 and 32. This may be determined by any suitable means such as by inserting a slender cylindrical tool 90 through tube 88 until its conical end enters aperture 31 and centers tube 88 therewith.

As soon as tube 88 is centered, the lower end of collar 87 is soldered to wall 30, and tool 90 removed, leaving tube 88 fixed to and concentric with the resonator apertures. Now a plug 91 having its lower face formed as a spherical reflector 92 is inserted through the projecting end of tube 88 until it is seated therein in proper location relative to aperture 31. This may be accomplished by any suitable means such as providing inwardly extending support lips 88' on the bottom of tube 88 prior to its assembly with the resonator. After seating, plug 91 is axially held in position, as by pinching in tube 88 at 93.

Tube 88 is connected to the usual terminal such as 17 in Fig. 1. The assembly shown in Fig. 9 not only accurately aligns the reflector and the resonator apertures, which has hitherto been very difficult with the small resonators now being developed, but also provides for effective tuning control since any shiftable tuning member, such as 64 or 82, actuated thermally or otherwise, may be attached solidly to collar 87.

The above method of aligning and permanently securing together the resonators and associated reflectors may be employed in any of the devices of the invention herein described.

Fig. 10 illustrates a further form of resonator 94 consisting of a thin hollow integral shell preferably made by the process above described for resonator 28. It comprises the same reentrant pole structure 29 apertured at 32 and in addition is formed with a relatively deep annular groove 95 adjacent and parallel to end wall 30. A suitable transmission line entrance port 96 is provided in the wall skirt below the groove, and aperture 31 is formed in the resonator wall opposite aperture 32. Groove 95 is provided during the above-described process of making integral shell resonators by cutting an external groove of suitable size in the blank prior to the plating operation. If desired, groove 95 could be formed as well by an outwardly extending annular section of sufficiently small mouth area in alignment with the cylindrical side wall to effectively short circuit the current across that mouth.

Fig. 11 somewhat diagrammatically illustrates a further manner of thermal tuning especially useful for such small resonators. The resonator 94 is supported by an annular member 96' rigid with the medial support 97 corresponding to support 57 in Fig. 8. Resonator 94 is preferably soldered to support 96'. An annular collar 98 has a flanged end 99 in solid and preferably soldered contact with unsupported end of resonator 94, and is formed with an outwardly extending flange 100. Thermal expansion strut 101 is concentric within a spaced tubular sheath 102 of inductively insulating material such as steel which passes in spaced relation through suitably large apertures in flange 100 and an outward extension of support 97.

At opposite ends, strut 101 is provided with suitable threaded fastening elements 103 and 104 which in turn are insulated electrically from flange 100 and support 97 through insulating flanged sleeves 105 and 106, respectively. Sheath 102 is spaced from rod 101 along its length and is electrically insulated therefrom by elements 105 and 106 as shown in Fig. 11. When fastening elements 103 and 104 are drawn tight, the parts of the thermal tuning assembly are properly associated since rod 101 is threaded in insulators 105, 106.

Rod 101 has suitable electrical terminals at its ends and varies in length according to the degree it is energized thereby varying the axial displacement of collar 98 to tune resonator 94. Sheath 102 prevents emanation of any magnetic fields incident to energization of rod 101 from disturbing the electron beam between the cathode and reflector. As with the tuning device shown in Fig. 7, it is apparent that this shielded tuning arrangement may be employed either within or outside the evacuated envelope, whichever is desired or convenient.

In Fig. 12 is shown a structure which may be employed where the radial dimensions are limited by structural considerations. Resonator 110 has its cylindrical circumferential wall 111 extended and formed with an outstanding annular section 112 having a radial depth equal to one-quarter of the resonant wavelength and located a distance equal to one-quarter of the resonant wavelength from end wall 113 of the resonator. This forms an annular half wave trap communicating with the resonator interior as in Figs. 6 and 7.

Wall 113 is turned outwardly parallel and close to wall 111 extended, being joined to wall 111 as indicated beyond section 112. Space 114 between walls 111 and 113 is similar to space 75 in Fig. 7 and functions similarly. Reflector 115 is preferably mounted in a metal holder 116 rigidly secured to wall 113 extended as by the insulating seal 117. When holder 116 is displaced axially, as by any tuning element above described, the resonator is tuned through axial displacement of wall 113 permitted by the bellows action available at section 112. Thus section 112 also serves as a weakened wall portion enabling accurate tuning.

In Fig. 13 a hollow cylindrical resonator 118 of suitable design, including any of those above described, is formed with a relatively deep reentrant pole 119 on one end of wall 121. Pole 119 and the other end wall 122 are apertured in alignment on the cylinder axis at 123 and 124, respectively. In larger sized resonators, grids are employed across apertures 123 and 124. A suitable indirectly heated cathode 125 is arranged to project an electron stream through the resonator.

A reflector member preferably consisting of a hollow cylindrical tube 126, sealed at its outer end 127 and open at its mouth 128 within pole 119 and adjacent aperture 123, is rigidly mounted in assembly with the resonator. Preferably tube 126 is mounted concentrically within a metal collar 129 by means of an insulating glass connection 131. Collar 129 is soldered to the resonator, similarly to member 87 in Fig. 9, so as to maintain tube 126 in exact axial alignment with the resonator apertures. This alignment may be accomplished similarly to the manner illustrated in Fig. 8, by inserting the locating mandrel through aperture 124.

A battery 132 furnishes the driving voltage for the cathode for projecting the electron stream to be velocity modulated toward aperture 124. After emerging from aperture 123 the electrons, which have been subjected to the usual alternate acceleration and retardation action due to the high frequency electric field between apertures 124 and 123, enter the interior of tube 126, the walls of which are maintained at cathode potential as by lead 133.

Within tube 126, the higher speed accelerated electrons travel farther than the slower speed retarded electrons before being repulsed by the charged walls of the tube as indicated by the arrows of different lengths. The electrons between apertures 123 and tube mouth 128 and within the tube are bunched according to the known theory of operation of such reflex devices, further explanation of which is not necessary for understanding this invention. Tube 126 thus functions equivalently to the reflectors shown in the other embodiments.

Fig. 14 illustrates a resonator and reflector assembly wherein resonator 28 is secured to a reflector mounting similarly to Fig. 9.

A relatively heavy intermediate metal support platform 133 formed with an external groove 134 has a central bore 135 shouldered at 136 to receive the periphery of resonator 28. Resonator 28 is also supported along its bottom wall by ribs 137 flush with shoulder 136. A concentric transmission line 138 of suitable type is formed with a reduced section 139 located within a radial platform bore opening from the bottom of groove 134 to port 42 in the resonator.

Upstanding from resonator wall 30 is a metal collar 140 carrying a concentric smaller tube 141 insulated therefrom by a glass or like sealing and mounting annulus 142. An elongated metal plug 143 formed at its lower end with a reflector face 144 is inserted within tube 141. Collar 140 is centered with and attached to the resonator, as by the process of Figs. 8 and 9, tube 140 being concentric with the resonator apertures and being soldered to wall 30. For further stability an insulated disc 145 is slipped over collar 140 to seat on a suitable shouldered recess above bore 135. Disc 145 is preferably rigidly secured to collar 140, as by a thermo-plastic adhesive.

The above assembly provides a fixed frequency resonator of small dimensions permanently associated with a reflector on a platform which can be readily incorporated with the remaining tube elements within the evacuated envelope.

Fig. 15 illustrates a further embodiment of the invention similar to Fig. 6, but wherein the cavity resonator device is made of two separate elements of the same shell thickness similarly to Fig. 7. The lower end of collar 59 has secured thereto a thin circular disc 146 of copper disposed at right angles to the axis of tube 60 and formed with a small central aperture 147. Disc 146 comprises one end wall of the resonator, the other end of which is the cylindrical body 148 formed with apertured pole 149 and being open toward disc 146, as illustrated. An annular rim 150 parallel to disc 146 extends outwardly from body 148 and defines with disc 146 a hollow flange enclosing a narrow annular space 151 open to the resonator space within body 148. The radial width of annular space 151 is approximately one-quarter of the resonant wavelength of the resonator, and space 151 is open along its outer periphery.

As explained above in connection with Fig. 6, the apparatus of Fig. 15 is the equivalent of Fig. 6 in structure, and effectively the same in operation. In the illustrated construction, the vacuum within the resonator is maintained by flexible member 71. Moreover, wave trap space 151 retains its function throughout the entire tuning range of the resonator effected by displacement of disc 146. This construction affords somewhat easier tuning than Fig. 6 wherein wall 49 is anchored along its outer periphery.

Fig. 16 illustrates a complete reflex device enclosed within a metal envelope 152 sealed to a platform 153 to which is also sealed the usual pronged base 154. Elongated posts 155 upstanding from platform 153 carry a fixed resonator support block 156 of metal and an upper plate 157. A suitable cathode assembly 158 is suspended from support 156 which is centrally apertured and formed with an enlarged recess 159 for seating a cylindrical resonator shell 160.

Shell 160 is of the general shape of those above described, having an apertured reentrant pole 161 on one end wall, and the upper centrally apertured wall is formed with an annularly crimped resilient portion 162 for flexibility in tuning. Inwardly of portion 162, the upper shell wall has secured thereto the lower end of a collar 163 formed with an upper enlarged portion to which is sealed an insulating annulus carrying an axially centered reflector button 164. An upper collar 165, rigid with collar 162, is secured rigidly to the lower end of an expansible thermal tuning strut 166, the upper end of which is fastened, as by screw 167 to insulated terminal 168.

A lead 269 connects terminal 168 with a prong in the base (not shown), and the lower end of strut 166 is at ground potential within the tube. Hence, as strut 166 expands or contracts upon varying energization, it reacts against relatively fixed terminal 167 and transmits its axial displacement into flexing movement of the upper resonator wall, thereby effecting tuning of the resonator.

Shell 160 is between three and four times as large in diameter as shell 28 of Fig. 1 and has about the same depth and resonator electrode gap spacing as in shell 28. Because of this increased diameter, shell 160 would normally resonate at a fundamental mode of about three centimeters wavelength. In order to render shell 160 the equivalent of shell 28 as a source of one centimeter wavelength energy, we provide a pair of substantially diametrically aligned damper wires 169 which extend parallel to the resonator axis and are anchored in the opposite end walls. Each wire 169 has an intermediate flexible portion 170 to permit tuning displacement of the resonator wall.

Damper wires 169 are equidistant from the axis and so located that they eliminate oscillation of the resonator at its fundamental three centimeter mode but do not interfere with the hamonic which produces resonance in the one centimeter mode. Effectively, therefore, shell 160 is equivalent to a much smaller shell resonating at one centimeter wavelength, but has the advantage of far larger physical dimensions which make it easier to mount and control.

In actual practice we have built a shell 160, by the method above described for shell 28, which resonates at approximately one centimeter and has the following dimensions: overall diameter, 0.754 inch; distance between damper wires, 0.256 inch; distance between electrodes (wall and pole apertures), 0.006 inch; and altitude of pole, 0.066 inch. The damper wires need not be accurately, but only approximately on a diameter.

Although concentric lines are useful for many embodiments, it is equally preferable to employ wave guides for extracting energy from the resonator. The main objection to the use of wave guides is their relatively large physical dimensions which make it difficult to properly couple them to small resonators. In Figs. 16 and 17 we have disclosed solutions of this problem.

In Fig. 16, we employ a wave guide tube 171 terminating in an antenna loop 172. In order to appreciably reduce the physical dimensions of the guide, we fill it with a material 173 having a high dielectric constant. For example, the interior of the guide is filled with sintered titanium sesquioxide ($Ti_2O_3$) or an equivalent material of about the same specific inductive capacity. This enables the use of a small cross-section wave guide tube. The free end loop 172, as shown, extends within the guide a sufficient distance to insure launching of wave energy down the guide.

The outer end of guide 171 is closed by a glass or like seal 174 and is coupled at right angles to a hollow rectangular wave guide 175 of any suitable dimensions having an adjustable end wall 176 for matching its impedance to the concentric line. Since glass has a relatively low dielectric constant for the purpose at hand it is necessary to provide a conductor 177 extending therethrough with its outer end terminating within wave guide 175.

The above method of coupling a wave guide of small dimensions is equally applicable to any of the herein described resonators, as it appreciably reduces the problems of extracting energy for external use.

Another useful manner of extracting high frequency energy from a small hollow resonator is the wave guide coupling shown in Fig. 17, wherein cylindrical resonator shell 178 has an end closed by the grid mounting wall 179 and is formed with a relatively narrow side wall slot 181 to receive the similarly shaped rectangular end 182 of a relatively large hollow wave guide 183. Where air is the dielectric within the wave guide 183, its dimensions would be larger than shown, probably greater than the resonator dimensions. By using a suitable dielectric filling, as in Fig. 16, the size of wave guide 183 may approximate that illustrated.

Slot 181 is preferably arranged with its length at right angles to the direction of current flow within the resonator for highest efficiency. The angle of slot 181 relative to the cylinder axis may be altered as desired to vary the degree of coupling with the resonator. For other modes of oscillation within the resonator, and for different shaped resonator shells, the location of the slot would be accordingly determined.

As apparent from the above, the invention solves many difficult problems of assembly and operation of velocity modulation devices operating at short wavelengths in the neighborhood of one centimeter or less; and certain of the principles may be extended as well to larger space resonator devices. The integral resonator shell and the permanent resonator and reflector assembly are entirely new products, and the tuning arrangements are especially adaptable to tuning such fragile shells. Another characteristic of the invention which is of extreme commercial value is the accurate resonator shell formation enabling very small resonators having designed fixed frequency to be made for the first time. It is noteworthy that the process is without appreciable waste, as the copper is sparingly used during electrolysis and the zinc is recoverable from the bath.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A tunable cavity resonator having wide tuning range comprising a main body having a cylindrical wall, a flange extending outward from an end of said cylindrical wall in a plane perpendicular to the axis of said cylindrical wall, and an end wall parallel to and spaced from said flange and forming therewith wave trap means for preventing leakage of ultra-high-frequency energy from said body, said flange and end wall being relatively movable to vary the resonant frequency of said resonator.

2. A tunable cavity resonator having wide tuning range comprising a main body having a cylindrical wall, a flange extending outward from an end of said cylindrical wall in a plane perpendicular to the axis of said cylindrical wall, and an end wall parallel to and spaced from said flange and forming therewith wave trap means for preventing leakage of ultra-high-frequency energy from said body, said flange and end wall being relatively movable to vary the resonant frequency of said resonator and the space between said end wall and said flange being open along its outer periphery.

3. The cavity resonator device defined in claim 1, wherein the space between said end wall and said flange is closed along its outer periphery.

4. The cavity resonator device defined in claim 1, wherein the space between said end wall and said flange is open at a point spaced from said main body a distance approximately equal to one-quarter of the resonant wavelength of said main body.

5. A tunable cavity resonator having wide tuning range comprising a main body having a cylindrical wall, a flange extending outward from an end of said cylindrical wall in a plane perpendicular to the axis of said cylindrical wall, and an end wall parallel to and spaced from said flange and forming therewith wave trap means for preventing leakage of ultra-high-frequency energy from said body, said flange and end wall being relatively movable to vary the resonant frequency of said resonator and the space between said end wall and said flange being open at a point spaced from said main body a distance approximately equal to an odd multiple of one-quarter of the resonant wavelength of said main resonator body.

6. The cavity resonator device defined in claim 1, wherein the space between said end wall and said flange provides a wave trap space approximately equal in length to one-half the resonant wavelength of said main resonator body.

7. A tunable cavity resonator having wide tuning range comprising a main body having a cylindrical wall, a flange extending outward from an end of said cylindrical wall in a plane perpendicular to the axis of said cylindrical wall, an end wall parallel to and spaced from said flange and forming therewith wave trap means for preventing leakage of ultra-high-frequency energy from said body, said flange and end wall being relatively movable to vary the resonant frequency of said resonator, and means defining a second annular hollow space open to the space between said end wall and said flange and projecting angularly from said flange, said second space being closed at its outer end and having its effective length and its distance from the mouth of said flange each approximately equal to one-quarter of the resonant wavelength of said main resonator body.

8. The cavity resonator device defined in claim 1, wherein said flange and end wall enclose an annular space concentric with the axis of said main resonator body.

9. In ultra high frequency apparatus, wall means of relatively thin electrically conductive material enclosing a resonator space adapted to contain a high frequency oscillating electrical field, a wave trap including a portion of said wall means, said portion of said wall means extending beyond said resonator space so as to provide a relatively large wall area readily flexible and deformable for changing the volume of and thereby tuning said resonator.

10. A cavity resonator device comprising means defining a generally cylindrical main body having axially apertured end walls, means defining a substantially annular hollow space projecting radially from said body and comprising radial outward extensions of the side wall and one end wall of said body, the interior of said space being open to the interior of said body and means defining a second generally annular hollow space open to said first space and projecting from said one end wall angularly to said first space-defining means and located at a position intermediate said main body and the outer periphery of said first annular space.

11. In the resonator defined in claim 10, a shiftable tuning member operably secured to said one end wall.

12. A cavity resonator device comprising means defining a generally cylindrical main body having axially apertured end walls, a substantially annular hollow flange projecting radially from said body and being defined by radial outward extensions of the side wall and one end wall of said body, the interior of said flange being open to the interior of said body, a second generally annular hollow flange open to said first flange and projecting from said one end wall angularly to said first flange and, a third generally annular hollow flange concentric with said second flange open to said first flange and projecting angularly from said first flange.

13. Ultra-high-frequency apparatus comprising a cavity resonator device having an apertured wall of electrically conductive material, a portion of said wall extending beyond the resonator space so as to provide a relatively large wall area readily flexible and deformable for changing the volume of and thereby tuning said resonator, a reflector mounted to deflect electrons discharged through said aperture and to return them through said aperture into the resonator, a mount for said reflector, means affixing the reflector mount directly to said wall in a substantially unitary assembly, and a shiftable tuning member secured to said reflector mount, so that movement of the tuning member simultaneously displaces said reflector and wall while maintaining the spacing between said reflector and said apertured wall.

14. A tunable cavity resonator for electron discharge apparatus comprising a cylindrical body wall, a first end wall fixed to said body wall, a movable end wall opposite said first end wall, said end walls having aligned apertures for permitting passage of an electron stream therethrough, and means permitting wide range of variation of the resonant frequency of said resonator in response to movement of said movable wall, said means including a radial extension of said movable wall and a radially outward extending flange fixed to said body wall and cooperating with said movable wall extension to form wave trap means for preventing leakage of high frequency energy through the space between said extension and said flange.

15. A tunable cavity resonator having a wide tuning range comprising a main body having a cylindrical wall, an extension from one end of said cylindrical wall, an extension from an end wall of said cavity, said second extension being parallel to and spaced from said first extension and forming therewith a first annular wave trap space for preventing leakage of ultra-high-frequency energy from said body, and means defining a second generally annular hollow space open to said first space and projecting angularly to the defining means of said first space, said second space being closed at its outer end and located at a position intermediate said main body and the outer periphery of said first annular space.

16. An anode structure for an ultra high frequency electric discharge device of the cavity resonator type comprising a metallic disk having a circular, centrally positioned opening therethrough defining in part a cavity resonator, an inwardly extending apertured conical member extending across the bottom of said opening defining one boundary of said cavity resonator, a circular flange extending upwardly from the top surface of said disk at a radial distance from the circumference of said opening equal to a half wave length at the operating frequency of said device, and a second metallic disc sealed across said flange constituting an opposite boundary of said cavity resonator and forming with said top surface a section of radial transmission line.

17. An anode structure for an ultra high frequency discharge device of the cavity resonator type comprising a metallic disk having a centrally positioned opening defining in part a cavity resonator, an entrance part for receiving electrons and producing a narrowly defined control region within said cavity resonator comprising an apertured metal cone constituting one boundary of said cavity resonator, a circular flange extending upwardly from the top surface of said disk at a radial distance from said opening equal to a half wave length at the operating frequency of said device, a second metallic disc connected across said flange constituting an opposite boundary of said cavity resonator and forming with said top surface a section of radial transmission line.

18. A cavity resonator comprising a hollow metallic member having a pair of parallel walls and a side wall integrally united with said parallel walls, one of said parallel walls having a centrally positioned opening therein, the other of said parallel walls having an inwardly extending cone-shaped part, said part terminating in a second opening aligned with the first of said openings, said one wall having a circular ridge therein concentric with said openings to permit flexing of said one wall to vary the distance between said parallel walls.

19. A cavity resonator comprising a hollow metallic member having a pair of parallel walls and a side wall integrally united with said parallel walls, one of said parallel walls having a centrally positioned opening therein, the other of said parallel walls having an inwardly extending cone-shaped part, said part terminating in a second opening aligned with the first of said openings, one of said walls having a circular ridge therein concentric with said openings to permit flexing of one of said walls to vary the distance between said parallel walls, one of said walls having an opening therein, and output electrode means extending into said resonator through said opening.

SIGURD F. VARIAN.
EDWARD L. GINZTON.

REFERENCES CITED

The following references are of record in the file of this patent:

UNITED STATES PATENTS

| Number | Name | Date |
| --- | --- | --- |
| 789,342 | Voelke | May 9, 1905 |
| 2,020,011 | Bart | Jan. 28, 1936 |
| 2,108,640 | Bieling | Feb. 15, 1938 |
| 2,128,231 | Dallenbach | Aug. 30, 1938 |
| 2,128,232 | Dallenbach | Aug. 30, 1938 |
| 2,128,233 | Dallenbach | Aug. 30, 1938 |
| 2,155,508 | Schelkunoff | Apr. 25, 1939 |
| 2,157,952 | Dallenbach | May 9, 1939 |
| 2,167,201 | Dallenbach | July 25, 1939 |
| 2,170,219 | Seiler | Aug. 22, 1939 |
| 2,183,215 | Dow | Dec. 12, 1939 |
| 2,220,840 | Metcalf | Nov. 5, 1940 |
| 2,245,627 | Varian | June 17, 1941 |
| 2,250,511 | Varian et al. | July 29, 1941 |
| 2,251,085 | Unk | July 29, 1941 |
| 2,259,690 | Hansen et al. | Oct. 21, 1941 |
| 2,279,872 | Llewellyn | Apr. 14, 1942 |
| 2,283,895 | Mouromtseff et al. | May 19, 1942 |
| 2,332,952 | Tischer et al. | Oct. 26, 1943 |
| 2,342,896 | Salzberg | Feb. 29, 1944 |
| 2,351,895 | Allerding | June 20, 1944 |
| 2,373,810 | Fremlin | May 1, 1945 |
| 2,410,822 | Kenyon | Nov. 12, 1946 |
| 2,411,912 | Vance | Dec. 3, 1946 |
| 2,414,785 | Harrison et al. | Jan. 21, 1947 |
| 2,429,243 | Snow et al. | Oct. 21, 1947 |